United States Patent
Chen et al.

(10) Patent No.: US 8,068,394 B2
(45) Date of Patent: Nov. 29, 2011

(54) RECORDING METHOD OF OPTICAL DISC DRIVE

(75) Inventors: Shih-Kuo Chen, Taoyuan County (TW); Chin-Fa Hsu, Taoyuan County (TW); Shiu-Ming Chu, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 531 days.

(21) Appl. No.: 12/269,059

(22) Filed: Nov. 12, 2008

(65) Prior Publication Data

US 2009/0161510 A1 Jun. 25, 2009

(30) Foreign Application Priority Data

Dec. 25, 2007 (TW) ................................. 96150439 A

(51) Int. Cl.
*G11B 7/00* (2006.01)
(52) U.S. Cl. .................... 369/47.53; 369/53.1; 369/116; 369/47.5; 369/47.55

(58) Field of Classification Search ................ 369/47.5, 369/47.53, 47.55, 53.1, 116
See application file for complete search history.

(56) References Cited

U.S. PATENT DOCUMENTS

| | | | |
|---|---|---|---|
| 2003/0123352 A1* | 7/2003 | Chen | 369/47.53 |
| 2005/0259537 A1* | 11/2005 | Kim | 369/47.5 |
| 2008/0101174 A1* | 5/2008 | Lin | 369/47.5 |

* cited by examiner

*Primary Examiner* — Latanya Bibbins
(74) *Attorney, Agent, or Firm* — Winston Hsu; Scott Margo

(57) ABSTRACT

The invention is to provide a recording method of an optical disc drive, which first calibrates the write power with minimum recording speed, adjusts write powers for higher speeds, searches a blank area in a lead-out area of a disc to record with write powers for all speeds, read signals, deletes the speeds with bad recording quality, reserves the speeds with good recording quality as recordable speed, checks the required recording speed for the address of the recording data, searches the recordable speed equal to or smaller than the required recording speed, replaces the required recording speed with the searched recordable speed, records data with the searched recordable speed and corresponding write power to ensure quality.

9 Claims, 3 Drawing Sheets

RECORDING METHOD OF OPTICAL DISC DRIVE

BACKGROUND OF THE INVENTION

1. Field of the Invention

The invention relates to a recording method of an optical disc drive, and more particularly, to a method for choosing recordable speeds by verifying results of testing write powers while the optical disc drive records data onto an optical disc.

2. Description of the Prior Art

An optical disc drive emits a laser beam irradiated from an optical pick-up head on a recordable optical disc to form marks, such as pits or phase changes, where different reflected laser intensities of a marked area and an unmarked area can be utilized to distinguish digital values 1 and 0. In this way, the goal of recording data on the optical disc is achieved. Therefore, the quality of marks recorded on the optical disc depends on the laser power and the irradiation time. However, the irradiation time is decreased when the rotation speed of the optical disc increases.

Although the quality of marks recorded on the optical disc is better when the rotation speed is slower and the irradiation time is longer, the recording performance of the optical disc drive is degraded due to the fact that slower rotation speed of the optical disc makes the recording time inevitably increase.

The capacity of optical discs has become larger and larger. In order to shorten the recording time, as shown in FIG. 1, a conventional optical disc drive rotates an optical disc 2 by a spindle motor 1, moves an optical pick-up head 3 in a radial direction back and forth, and uses the optical pick-up head 3 to irradiate a laser beam onto the optical disc 2. Because the outer tracks of the optical disc 2 have higher tangential velocity, the optical disc 2 is divided into several areas from the inner track to the outer track according to different recording speeds. By changing addresses under default recording speeds which vary from a low recording speed to a high recording speed step by step, such as 2×, 4×, 6× and 8×, the recording speed of the outer track is increased to thereby reduce the overall recording time.

However, as there are many manufacturers that produce optical discs 2, the materials, ingredients and manufacturing processes of the optical discs 2 made by different manufacturers might be different. This makes optical discs 2 manufactured by different manufacturers have different reflective characteristics in response to the laser beam. Therefore, the conventional optical disc 2 is configured to have the most inner track and the most outer track respectively serving as an inner track test area 4 and an outer track test area 5 for testing the laser power to obtain an optimum laser power used for recording data onto the optical disc. A conventional optical disc drive performs a recording test by recording default test data at the inner track test area 4 or the outer track test area 5 at a low recording speed 2×, and then reads out data which has been recorded onto the optical disc 2 by the recording test. Next, a recording quality parameter (e.g., a Beta parameter) used for evaluating the recording quality of the marks is derived by the amount of reflected light corresponding to recorded marks, decoding error rate, signal intensity, etc. An Optimum Power Control (OPC) is implemented to choose the optimum write power in accordance with a plurality of recording quality parameters derived from the recording test. To shorten the recording time required by the recording test, the write powers of higher recording speeds are estimated using the optimum write power of the low recording speed 2× and ratios between the low recording speed 2× and the higher recording speeds. After the optimum laser powers for different recording speeds are successfully derived, the conventional optical disc drive proceeds with normal data recording.

However, the conventional optical disc drive does not obtain the write power used for high recording speed from an actual test; instead, the conventional optical disc drive directly derives the recording power used for high recording speed from a test result of recording default data at the low recording speed, which makes it difficult to control the recording quality of the higher recording speeds of the optical disc. What is worse is that the optical disc even has bad readability of recorded data or is unreadable. However, implementing a recording test for each recording speed takes up more test areas, which reduces capacity available for normal data storage of the optical disc, and also makes it necessary to prepare, transfer and record the default test data of the recording test applied to each recording speed. This lengthens the recording time and degrades overall recording performance. Besides, the optical disc drive cannot support optical discs made by all manufacturers. While implementing a recording test on an unsupported optical disc, the optimum write power derived from recording limited default data at a lowest recording speed may not have acceptable recording quality, not to mention the estimated write powers for higher recording speeds. Therefore, the conventional recording test employed in the optical disc drive still has problems to be worked out.

SUMMARY OF THE INVENTION

One objective of the present invention is to provide a recording method of an optical disc drive for ensuring a recording quality by verifying an estimation result of a low recording speed test and deleting unsuitable recording speeds.

Another objective of the present invention is to provide a recording method of an optical disc drive for increasing the readability of data recorded on an optical disc as well as reducing the waste of optical discs by replacing and deleting any unsuitable recording speed with a lower recording speed.

A further objective of the invention is to provide a recording method of an optical disc drive for decreasing a data amount of test data to be recorded and disc space occupied by the recorded test data by directly using results of the recording test and estimation to verify suitability of a write power for each recording speed, instead of applying a test on each of the recording speeds.

A still further objective of the invention is to provide a recording method of an optical disc drive for verifying results of the recording test in a lead-out area of an optical disc, thereby avoiding affecting the disc capacity available for normal data storage and the normal recording operation of the optical disc drive.

In order to achieve the above-mentioned objectives, the recording method of the present invention performs a recording test using a default lowest recording speed, performs an estimation for write powers of higher recording speed, searches a blank area in a lead-out area of an optical disc, verifies results of the recording test and the estimation, reading signals of recorded data on the optical disc, deletes unsuitable recording speeds with bad recording quality, checks the required recording speed for the address of the recording data, performs a sequential search upon suitable recording speeds from the required recording speed, replaces the required recording speed with a searched suitable recording speed, and uses the searched suitable recording speed and an estimated write power of the searched suitable recording speed to do the data recording.

These and other objectives of the present invention will no doubt become obvious to those of ordinary skill in the art after reading the following detailed description of the preferred embodiment that is illustrated in the various Figures and drawings.

DETAILED DESCRIPTION

In order to achieve above objectives, preferred embodiments of the invention in conjunction with accompanying drawings are illustrated to detail the adopted technique and the benefits thereof.

Figure 1:
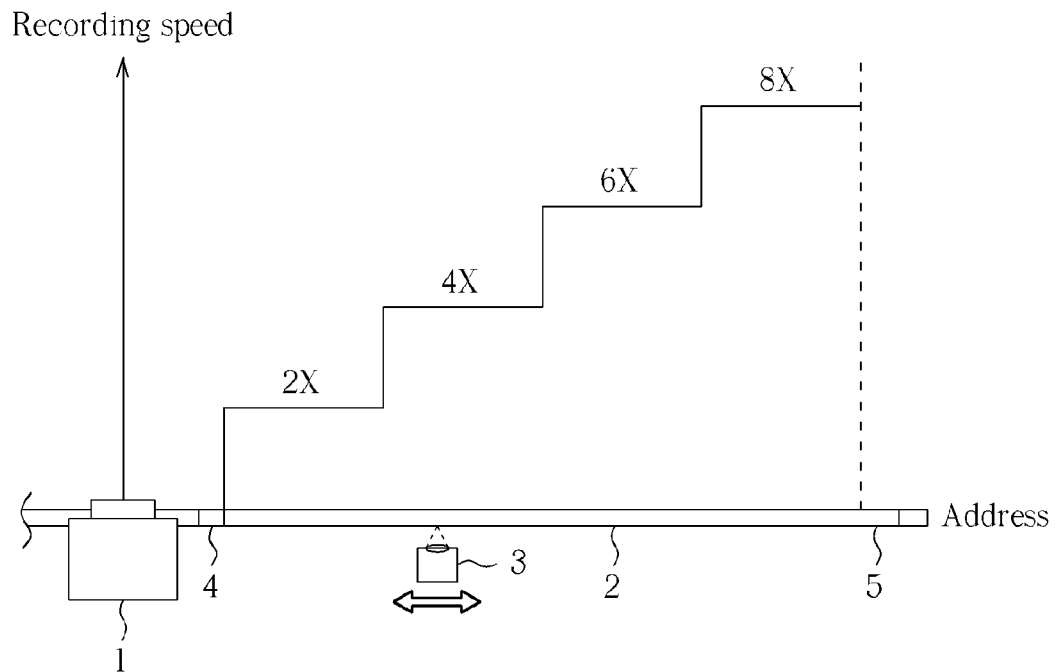
FIG. 1 is a diagram illustrating a recording process of a conventional optical disc drive.
Figure 2:
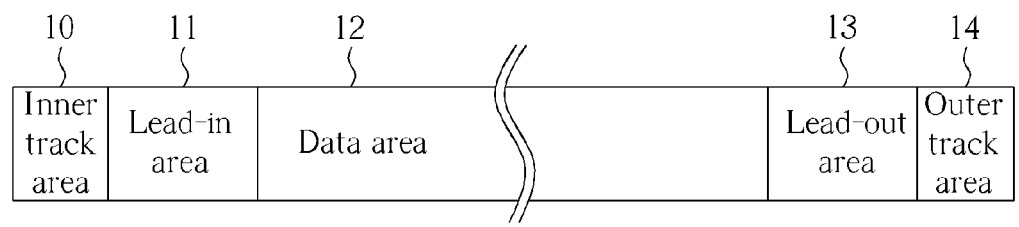
FIG. 2 is a data structure of an optical disc.

Please refer to FIG. 2. FIG. 2 is a data structure of an optical disc. In general, a circular optical disc has a spiral data track which starts from a position close to a center hole of the optical disc to an outer rim of the optical disc. The data track is divided into an inner track area 10, a lead-in area 11, a data area 12, a lead-out area 13 and an outer track area 14 from an inner track to an outer track. Inner track area 10 and outer track area 14 are used for recording tests for deriving optimum write power of the optical disc. Lead-in area 11 is to record a table of content (TOC) and characteristic information of the optical disc, where some blanks are reserved therein. Data area 12 is the actual portion where the optical disc drive records data. The lead-out area 13 following the data area 12 is used to mark the end of data recording, where some blanks are reserved therein.

In order to prevent the recording test at the outer track area 14 from affecting the normal data recording task and the capacity available for normal data storage, a recording method of an optical disc drive according to the invention searches the lead-out area 13 for a reserved blank area available for data recording as a verification area used to verify the optimum write power obtained by the recording test at the inner track area 10 or outer track area 14 and the estimated write powers of higher recording speeds, where the test data has restricted data amount and does not occupy much disc space, and the reserved blank area in the lead-out area 13 is therefore enough for all the test data. Then the optimum write power obtained by the recording test at the inner track area 10 or outer track area 14 and estimated write power of higher recording speeds are used to record test data into the reserved blank area found in the lead-out area 13 respectively, and then signals of the recorded test data are read out to check if the recording quality parameter of each recording speed is within a default range. If the recording quality parameter is within the default range, it means that the recording quality at the specific recording speed is normal to therefore make the retrieved data recognizable, and the write power can be used for data recording at the specific recording speed. However, if the recording quality parameter is out of the default range, this means that the recording quality at the specific recording speed is too bad to make the retrieved data recognizable, and the specific recording speed should be prohibited from being used in data recording.

Therefore, the recording method of the optical disc drive according to the invention checks which pre-defined recording speed area the recording address belongs to as soon as entering a data recording position while recording data onto the optical disc. That is, the recording method of the optical disc drive according to the invention searches a corresponding verified recording speed used for performing data recording. If the recording quality parameter of the corresponding verified recording speed is out of the default range at a verification phase and deleted, the searching procedure proceeds with recording speeds lower than the corresponding verified recording speed sequentially to find a substitute recording speed suitable for data recording at the current recording address. Although the recording time gets even longer due to recording data at a lower recording speed, the readability of data recorded on the optical disc is maintained, avoiding producing an optical disc with unreadable data. Therefore, the time that was wasted recording data onto the optical disc and that the optical disc wasted on recording the data can be saved. If the searching procedure finds that there is no lower recording speed available for acting as a substitutive recording speed, an error message indicative of the recording failure is reported to a computer host, and the data recording operation is terminated to prevent the data from being recorded using an unsuitable recording speed and write power. Thus, the time that was wasted recording data onto the optical disc and that the optical disc wasted on storing the data can be prevented.

Figure 3:
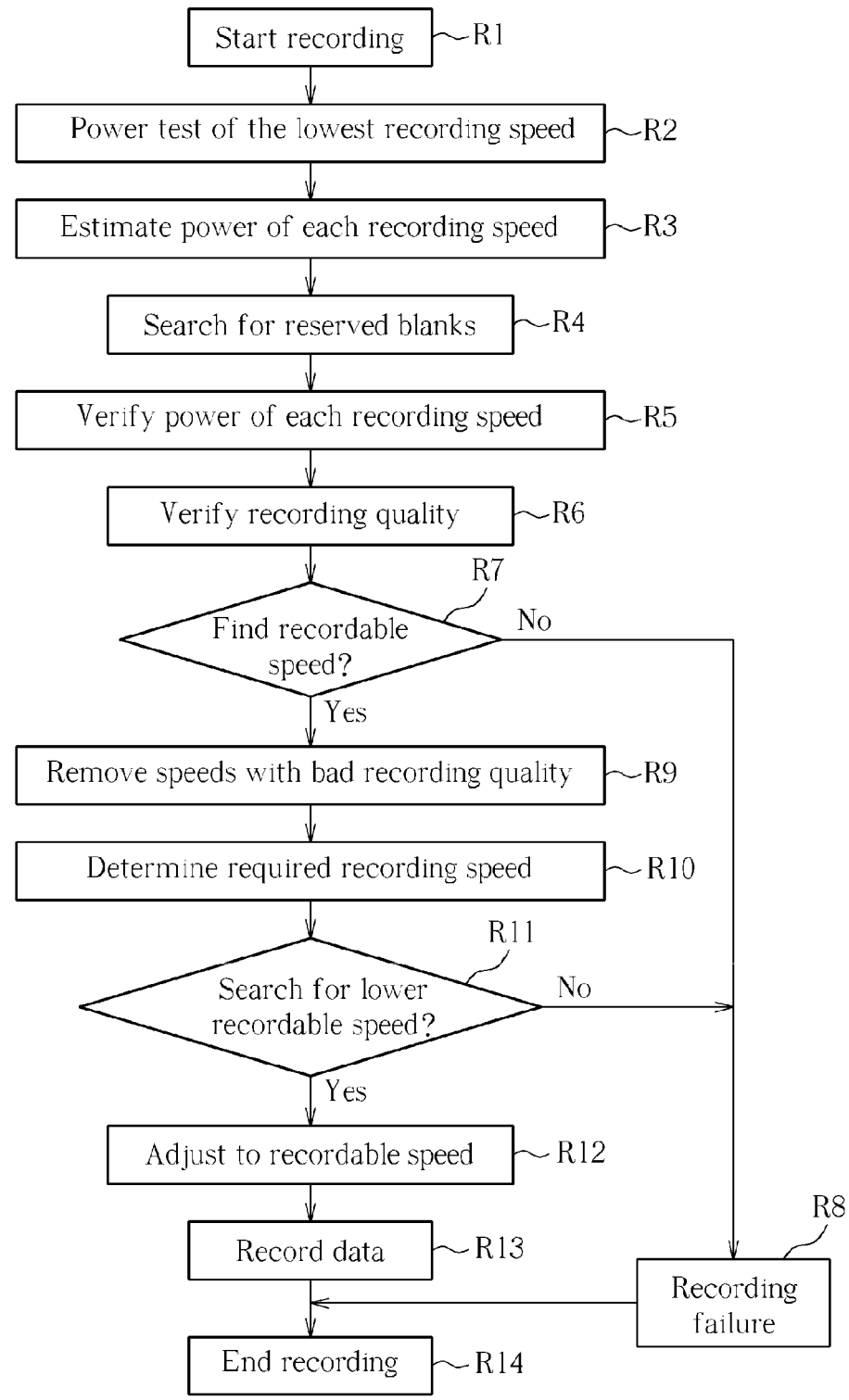
FIG. 3 is a flowchart illustrating a recording method of an optical disc drive according to a first embodiment of the invention.

FIG. 3 is a flowchart illustrating a recording method of an optical disc drive according to a first embodiment of the invention. The detailed steps directed to deleting unsuitable recording speeds by verifying the optimum write power obtained from the recording test and the estimated write powers of higher recording speeds are as follows. In step R1, an optical disc drive is started up and proceeds with recording data onto an optical disc. In step R2, the optical disc drive uses the lowest recording speed, such as 2×, to perform an OPC operation at the inner track area or the outer track area of the optical disc for obtaining the optimum write power corresponding to the lowest recording speed. In step R3, with the recording speeds assigned to the divided sections on the optical disc in advance and the characteristics of the data transfer rate taken into consideration, the write power of each higher recording speed can be estimated according to the optimum write power of the lowest recording speed that is derived in Step R2 and a ratio of the lowest recording speed and the higher recording speed.

In step R4, by way of example, the present embodiment searches reserved blanks in the lead-out area to serve as a verification area. In step R5, verification is initiated to record test data into the reserved blanks of the lead-out area using the lowest recording speed with its corresponding optimum write power and the higher recording speeds respectively with corresponding estimated write powers. In step R6, signals of recorded data corresponding to recording speeds under test are read out for determining the recording quality parameters which are used for judging the recording qualities for the write powers at different recording speeds. In step R7, each of the recording qualities corresponding to the predetermined recording speeds is checked to see if it is within a default range. In other words, step R7 is to check if there is any suitable recording speed available in the predetermined recording speeds. If there is no suitable recording speed, the flow proceeds with step R8 to inform a computer host of an error message indicative of a recording failure, and then goes to step R14 to end the recording process. If there is at least one suitable recording speed, the flow proceeds with step R9 to remove recording speeds with bad recording quality from the predetermined recording speeds, therefore reserving the suitable recording speeds.

In step R10, the required recording speed for data recording is determined by confirming to which recording speed area of the optical disc the recording data is stored according to the address of the recording data. In step R11, a downward sequential search upon recording speeds reserved in step R9 is started from the required recording speed. If there is no suitable recording speed that can be found, the flow proceeds with step R8 to inform the computer host of an error message indicative of a recording failure, and then goes to step R14 to end the recording process. If a suitable recording speed is found, the flow proceeds with step R12 to replace the previously required recording speed with the searched recording speed and the write power corresponding to the searched recording speed is used instead. In step R13, data recording proceeds. After the data recording is completed, the flow enters step R14 to end the recording process.

Figure 4:
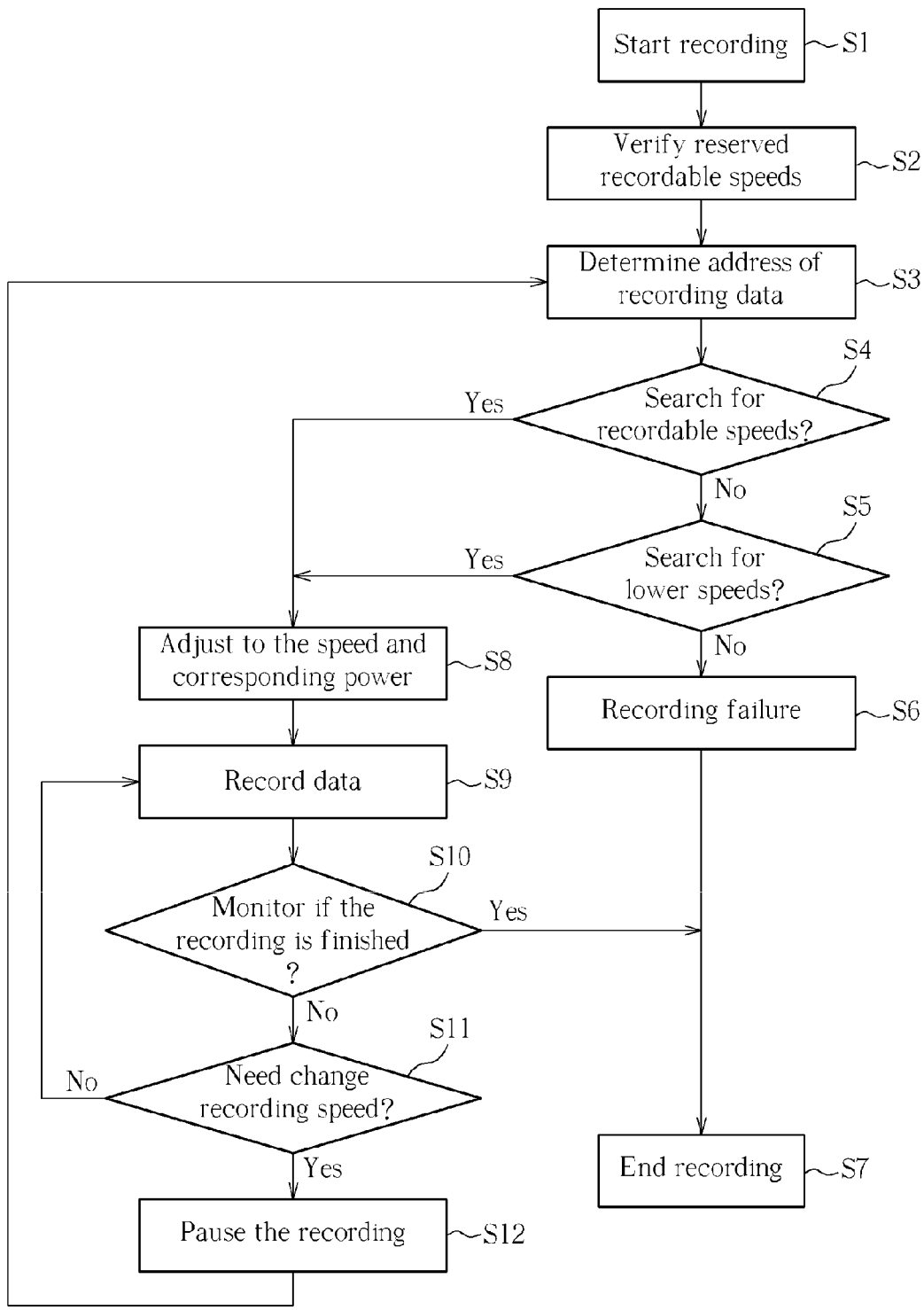
FIG. 4 is a flowchart illustrating a recording method of an optical disc drive according to a second embodiment of the invention.

Please refer to FIG. 4. FIG. 4 is a flowchart illustrating a recording method of an optical disc drive according to a second embodiment of the invention. In this embodiment, the recording test, write power estimation, searching for blanks, verification, and excluding unsuitable recording speeds are substantially identical to that described in the first embodiment mentioned above. The major difference is that the data to be recorded onto the optical disc has a longer data length, and has to be recorded to different recording speed areas. At the boundary between two adjacent recording speed areas, the flow pauses the data recording, performs a sequential search to find a lower recording speed used for replacing the deleted high recording speed, and then resumes the data recording. In this way, the overall recording time can be reduced.

The detailed steps of the second embodiment are as follows. In step S1, an optical disc drive is started up and proceeds with recording data onto an optical disc. In step S2, unsuitable recording speeds are deleted and suitable recording speeds are reserved through the recording test, estimation, searching for blanks, and verification. In step S3, the required recording speed for data recording is determined by confirming to which recording speed area of the optical disc the recording data is presumed to be recorded according to the address of the recording data. In step S4, a search is made of the reserved suitable recording speeds for the required recording speed. If no suitable recording speed is found, the flow proceeds with step S5 to search for a lower recording speed. If there is still no suitable recording speed found, the flow goes to step S6 to inform a computer host of an error message indicative of a recording failure, and then enters step S7 to end the recording process. If a suitable recording speed (i.e., the required recording speed) is successfully found in step S4 or a lower recording speed is successfully found in step S5, the flow proceeds with step S8 to use the searched suitable recording speed (i.e., the required recording speed) or the searched lower recording speed which replaces the required recording speed, and the write power is set to the power corresponding to the searched suitable recording speed/lower recording speed. The flow then enters step S9 to perform data recording.

Next, in step 10, the recording is monitored to see if all of the data have been recorded onto the optical disc. If yes, the flow proceeds with step S7 to end the recording process; otherwise, the flow proceeds with step S11 to check whether the recording position has arrived at the boundary between two adjacent recording speed areas on the optical disc. If the recording position has not arrived at the boundary of two adjacent recording speed areas, the flow goes back to step S9 to keep recording data onto the optical disc at the original recording speed. However, if the recording position arrives at the boundary between two adjacent recording speed areas, the flow enters step S12 to pause the data recording and go back to step S3 to confirm the required recording speed of the recording data by the address of the recording speed area and search for a suitable recording speed or a lower recording speed to carry on the data recording.

From the above two exemplary embodiments, the recording method of the optical disc drive according to the present invention reads the recording quality of the signals of the test data that resulted from the recording test, deletes recording speeds with bad recording quality, and replaces deleted unsuitable recording speeds with recording speeds with acceptable recording quality or lower recordable speeds. As the substitute recording speed, instead of the unsuitable recording speed, is employed, the recording quality is secured. Besides, the present invention is also allowed to utilize lead-out areas in an optical disc to directly record results of the recording test and the write power estimation for verifying each recording speed's suitability. Therefore, the recording method of the present invention does not have to test each recording speed, which greatly reduces the amount of test data to be recorded and disc space occupied by the recorded test data; in addition, the recording method of the present invention does not affect the storage capacity for normal data storage and normal data recording operation of the optical disc drive.

Those skilled in the art will readily observe that numerous modifications and alterations of the device and method may be made while retaining the teachings of the invention.

What is claimed is:

1. A recording method of an optical disc drive, comprising the steps of:
   (a) performing a recording test and an estimation of write powers of a plurality of recording speeds;
   (b) verifying results of the recording test and the estimation, and reserving suitable recording speeds, comprising:
      reading signals of recorded data
      deleting any recording speed with a bad recording quality; and
      reserving any recording speed with a good recording quality as a suitable recording speed according to the results of the recording test and the estimation;
   (c) confirming a required recording speed for an address of data to be recorded;
   (d) performing a downward sequential search upon suitable recording speeds from the required recording speed;
   (e) replacing the required recording speed with a searched suitable recording speed, and utilizing the searched suitable recording speed and an estimated write power corresponding to the searched suitable recording speed; and
   (f) recording the data.

2. The recording method of claim 1, wherein the recording test performs a write power test at a default lowest recording speed to obtain a corresponding optimum write power, and the estimation estimates a write power of each recording speed higher than the default lowest recording speed according to a plurality of recording speed areas partitioned on an optical disc in advance and the optimum write power corresponding to the default lowest recording speed.

3. The recording method of claim 1, wherein step (b) comprises:
   searching a blank area in a lead-out area of an optical disc to serve as a verification area.

4. The method of claim 1, wherein when a recording quality parameter of a signal of recorded data corresponding to a specific recording speed is within a default range, the specific recording speed is determined to have a good recording quality.

5. The method of claim 1, wherein after step (b), the method further comprises:

checking if there is any reserved suitable recording speed; if yes, proceeding with step (c); otherwise, reporting a recording failure.

6. The method of claim 1, wherein after step (d), the method further comprises:

checking if there is any reserved suitable recording speed that is found; if yes, proceeding with step (c); otherwise, reporting a recording failure.

7. The method of claim 6, wherein step (d) searches a next recording speed which is lower than the required recording speed.

8. The method of claim 1, wherein after step (f), the method further comprises:

(g) monitoring if a data recording of the data is completed; if yes, ending the data recording; otherwise, continuing recording the data.

9. The method of claim 8, wherein continuing recording of the data in step (g) comprises:

(h) checking if a recording position arrives at a boundary between two adjacent recording speed areas; if yes, pausing the data recording; otherwise, going back to step (f) to continue the data recording at a currently used recording speed.

* * * * *